US011144707B2

(12) United States Patent
Navarro

(10) Patent No.: US 11,144,707 B2
(45) Date of Patent: Oct. 12, 2021

(54) TECHNIQUES FOR TEXT RENDERING USING FONT PATCHING

(71) Applicant: NETFLIX, INC., Los Gatos, CA (US)

(72) Inventor: Pedro Navarro, Santa Clara, CA (US)

(73) Assignee: NETFLIX, INC., Los Gatos, CA (US)

( * ) Notice: Subject to any disclaimer, the term of this patent is extended or adjusted under 35 U.S.C. 154(b) by 0 days.

(21) Appl. No.: 16/430,125

(22) Filed: Jun. 3, 2019

(65) Prior Publication Data

US 2020/0380068 A1 Dec. 3, 2020

(51) Int. Cl.
*G06F 17/00* (2019.01)
*G06F 40/109* (2020.01)
*G06F 40/131* (2020.01)
*G06F 8/65* (2018.01)

(52) U.S. Cl.
CPC .............. *G06F 40/109* (2020.01); *G06F 8/65* (2013.01); *G06F 40/131* (2020.01)

(58) Field of Classification Search
CPC ......... G06F 40/109; G06F 40/131; G06F 8/65
USPC ....................................................... 715/269
See application file for complete search history.

(56) References Cited

U.S. PATENT DOCUMENTS

| 9,230,514 | B1* | 1/2016 | Bacus ...................... G09G 5/24 |
| 9,349,202 | B1* | 5/2016 | Manohar ............ G06K 9/00463 |
| 10,275,426 | B1* | 4/2019 | Cao ........................ G09G 5/26 |
| 2002/0099867 | A1 | 7/2002 | Wilkinson et al. |
| 2004/0088657 | A1* | 5/2004 | Brown .................. G06F 40/109 |
| | | | 715/234 |
| 2006/0170684 | A1 | 8/2006 | Kobayashi et al. |
| 2006/0232588 | A1* | 10/2006 | Opstad ................... G06F 40/109 |
| | | | 345/467 |
| 2009/0009519 | A1* | 1/2009 | Sugiyama ............. G06F 40/109 |
| | | | 345/467 |
| 2009/0284778 | A1 | 11/2009 | Hodder et al. |
| 2009/0303241 | A1* | 12/2009 | Priyadarshi ........ H04N 21/4348 |
| | | | 345/471 |
| 2009/0313245 | A1* | 12/2009 | Weyl .................... G06F 16/5846 |
| 2010/0283786 | A1* | 11/2010 | Opstad .................. G06F 40/109 |
| | | | 345/467 |

(Continued)

FOREIGN PATENT DOCUMENTS

WO 01/91088 A1 11/2001

OTHER PUBLICATIONS

International Search Report for application No. PCT/US2020/035779 dated Sep. 14, 2020.

*Primary Examiner* — Hassan Mrabi
(74) *Attorney, Agent, or Firm* — Artegis Law Group, LLP

(57) ABSTRACT

Various embodiments disclose a computer-implemented method that includes receiving, subsequent to a first font file being stored in read-only memory, a first font patch file for storage in read-write memory, where each of the first font file and the first font patch file is associated with a first font and includes a different set of glyphs used to render characters for display, and a first set of glyphs included in the first font file is static, determining that a first text string includes a first set of characters to be rendered, retrieving, from at least one of the first font file and the first font patch file depending on whether a first glyph is included in the first set of glyphs, the first glyph corresponding to a first character included in the first set of characters, and rendering a portion of the first text string using the first glyph.

21 Claims, 8 Drawing Sheets

(56) References Cited

U.S. PATENT DOCUMENTS

| | | | |
|---|---|---|---|
| 2012/0170906 A1* | 7/2012 | Soroushian | G11B 27/005 386/241 |
| 2013/0120396 A1* | 5/2013 | Kaplan | G06T 11/203 345/471 |
| 2013/0127872 A1 | 5/2013 | Kaplan | |
| 2013/0174017 A1* | 7/2013 | Richardson | G06F 40/10 715/234 |
| 2015/0178248 A1* | 6/2015 | Hanninen | G06T 11/60 715/234 |
| 2016/0170940 A1 | 6/2016 | Levantovsky | |
| 2016/0196676 A1* | 7/2016 | Chapman | G06F 40/12 345/467 |
| 2018/0293213 A1* | 10/2018 | Gore | G06F 40/109 |
| 2018/0349444 A1* | 12/2018 | Mulligan | G06T 11/001 |

\* cited by examiner

TECHNIQUES FOR TEXT RENDERING USING FONT PATCHING

BACKGROUND

Field of the Invention

Embodiments of the present invention relate generally to audiovisual processing and, more specifically, to techniques for text rendering using font patching.

Description of the Related Art

An electronic device renders text for display by retrieving characters from stored character sets. For example, an electronic device displays both a video component of an audiovisual program and the corresponding subtitles in a subtitle area of the display screen. In another example, the electronic device displays titles for various content items as text strings in specific areas of a user interface. In order to generate the text displayed by the electronic device, a user, such as content provider administrator, initially defines a text string that is to be displayed. For example, a subtitler could define a text string that corresponds to a particular portion of the spoken dialog within the defined time period. When rendering a text string, the electronic device receives a command to render a specific text string for display, identifies each of the characters used in the text string from an applicable character set stored in a font file, and renders each of the characters using outlines ("glyphs") included in the character set.

One drawback with rendering text using stored font files is that the electronic device has difficulty finding characters for written languages that utilize a large character sets. For example, a common set of Chinese characters includes 2,500-3,000 characters. Font files that include such large character sets occupy a large portion of memory on the electronic device. As a result, various electronic devices store font files that include a limited character set for a given language. However, in such instances, the electronic device may be unable to find various characters that are included in a text string to be displayed. For example, when the electronic device attempts to render a text string that includes a character that does not have a corresponding character set included in the stored font file, the electronic device is unable to retrieve all the applicable glyphs in order to render the text string. When the electronic device cannot retrieve an applicable glyph for a character, the electronic device instead displays a non-defined glyph ("tofu"). Displaying non-defined glyphs diminishes the overall quality of the viewing experience, as a viewer is unable to read portions of a text string.

To address the above problems, some providers of audiovisual programs send update files to electronic devices that render text. When an electronic device receives an update file, the electronic device overwrites the stored font file in order to store an updated font file that includes an expanded character set. For example, a provider of an audiovisual program provides an update file that contains new character sets corresponding to new characters that have been added to a given language. The updated font file includes an expanded character set that includes the original character sets, as well as the additional character sets included in the update file. One limitation of this approach, however, is that various electronic devices restrict modifications to the font file. For example, various electronic devices store font files in portions of read-only memory, restrict certain writes to memory, or otherwise prevent any modifications or overwrites of the font file. In such instances where electronic device does not modify or overwrite the stored font file, the electronic device cannot update the stored font file with the character sets included in the update files. Consequently, such electronic devices are more likely to display non-defined characters and are more likely to diminish the overall quality of the viewing experience.

As the foregoing illustrates, more effective techniques for storing and updating fonts are needed in the art.

SUMMARY OF THE INVENTION

One embodiment of the present invention sets forth a computer-implemented method comprising receiving, subsequent to a first font file being stored in read-only memory, a first font patch file for storage in read-write memory, wherein each of the first font file and the first font patch file is associated with a first font, each of the first font file and the first font patch file includes a different set of glyphs that is used to render characters for display, and a first set of glyphs included in the first font file is static, determining that a first text string includes a first set of characters that is to be rendered, retrieving, from at least one of the first font file and the first font patch file depending on whether a first glyph is included in the first set of glyphs, the first glyph corresponding to a first character included in the first set of characters; and rendering at least a portion of the first text string using the first glyph.

Various embodiments disclose a computer-implemented method that includes receiving a first font patch file associated with a first font for storage in read-write memory, where a first font file associated with the first font is stored in read-only memory, determining that a first text string includes a first set of characters that is to be rendered, retrieving, from at least one of the first font file and the first font patch file, a first glyph corresponding to a first character included in the first set of characters, and rendering at least a portion of the first text string using the first glyph.

At least one technological advantage of the disclosed techniques is that a video playback device is able to store various files containing new characters for a particular font without requiring that a stored font file be modified or overwritten. In particular, by storing multiple font files for a specific font, the video playback device avoids rendering non-defined characters, as the video playback device is more likely to retrieve characters for a given text string.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
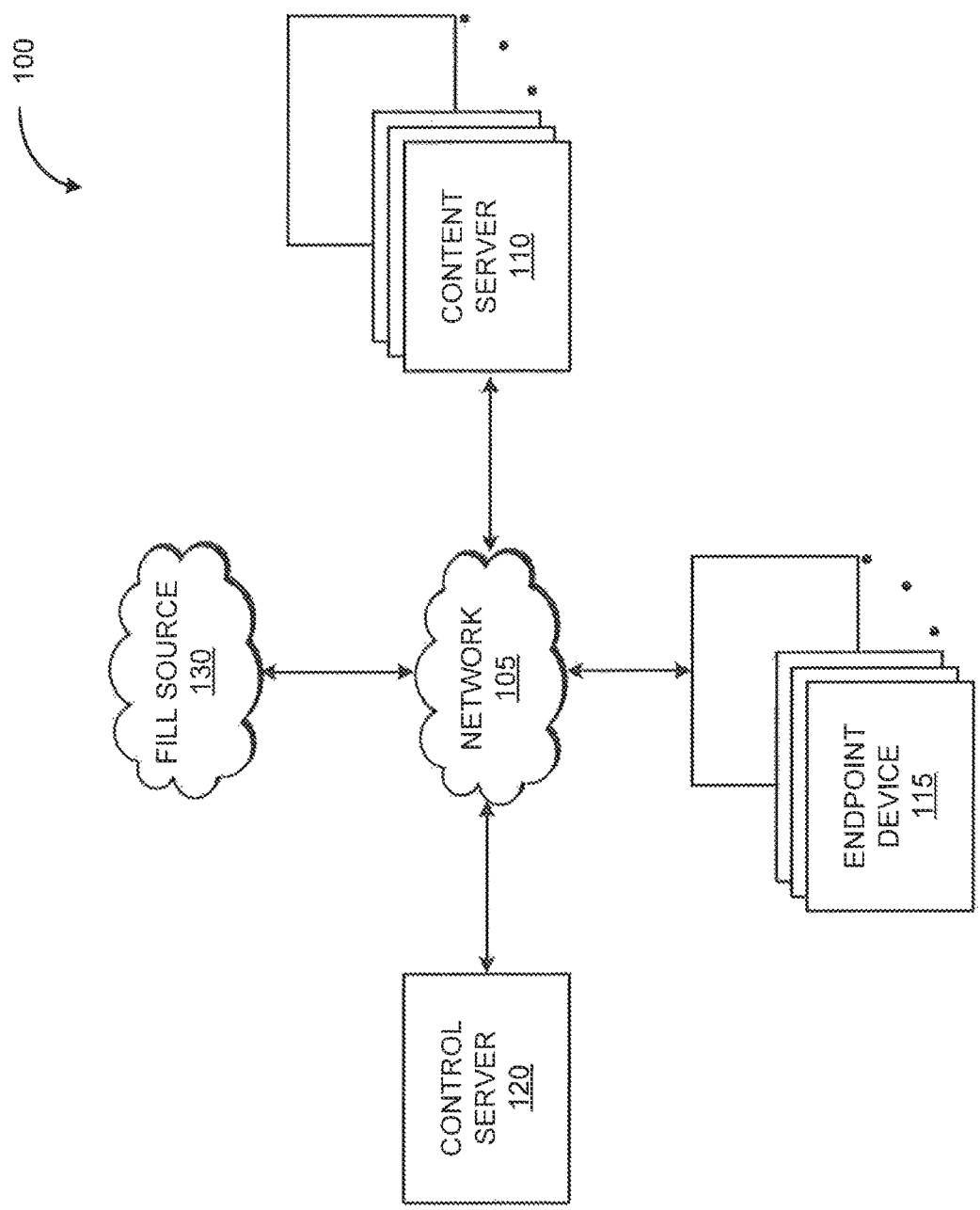
FIG. 1 illustrates a network infrastructure configured to implement one or more aspects of the present invention.

In the following description, numerous specific details are set forth to provide a more thorough understanding of the present invention. However, it will be apparent to one of skilled in the art that the present invention may be practiced without one or more of these specific details.

Overview

A video streaming service provides high-quality content to viewers. In certain instances, the video streaming service could provide various texts associated with a content item. Such text may include titles, plot descriptions, reviews, and other textual information about a title. Such text may also include various subtitles, including dialog, descriptions of audio content, and/or various translations of portions of the video during playback of the content item. For example, a video playback device could provide a graphical user interface (GUI) that displays the title of a content item and a description of the content item in a specific language. When streaming a portion of the content item, the video playback device could display various subtitles that correspond to the spoken dialog during a designated time interval.

In order to display the text, the video playback device renders text by retrieving character outlines ("glyphs") that correspond to each character that is to be displayed. For example, when the video playback device receives a command to display a text string, the video playback device searches an internal memory for a character set corresponding to each character in the text string. The corresponding character set stored in memory includes the glyph used to render the character. The video playback device identifies the corresponding character set, retrieves the glyph from the corresponding character set, and renders the text using the glyph. The video playback device renders the text string by retrieving the corresponding glyph for each character, renders the text string using the set of glyphs, and causes the display device to display the rendered text string in the applicable area of the display. However, when the video playback device does not have a corresponding character set stored in memory, the video playback device is unable to retrieve a corresponding glyph and instead renders the display with one or more undefined glyphs ("tofus"). For example, if the video display does not store a character set for the "é" character, upon receiving a command to render the word, "entrée," the video playback device instead renders "entr☐e."

Prior art techniques would have the video playback device modify or overwrite stored files to include additional character set. For example, a video playback device that stores a font file containing character sets for a base set of characters could receive an update file with additional character sets. The video playback device could then overwrite the font file and store an updated font file that includes an expanded group of character sets, where the expanded group includes the character sets included in the original font file and the additional character sets included in the update file. One drawback of such an approach is that a video playback device may restrict modifications to the font file. For example, various video playback devices store font files in portions of read-only memory, restrict certain writes to memory, or otherwise prevent any modifications or overwrites of the font file. In such instances, the video playback device cannot update the stored font file with the character sets included in the update files. Consequently, such video playback devices are more likely to display non-defined glyphs for a large number of characters included in various text strings and are more likely to diminish the overall quality of the viewing experience.

In various embodiments, a video playback device periodically receives and stores one or more font patch files in read-write memory in addition to a main font file stored in read-only memory. A video playback application stored in the video playback device includes a font manager and a layout engine. In operation, the layout engine receives a command to render a text string an area of a display device with a specific font. The layout engine sends the text string to the font manager. For each character included in the text string, the font manager performs a lookup of the character. The font manager performs the lookup by referring to the priority list associated with the font to identify the order in which portions of memory and/or files are searched when attempting to locate the corresponding character set for a character. For example, the priority list could specify a lookup in the main font file and, if the corresponding character set is not included in the main font file, a lookup in one or more font patch files. In various embodiments, the priority list may specify lookups in related fonts, such as different fonts for the same language and/or fonts for different languages. When the font manager locates the applicable character set, the font manager retrieves the glyph included in the character set. The font manager sends the retrieved glyph to the layout engine. The layout engine uses each glyph received from the font manager to render the text string. The layout engine sends the rendered text string to be displayed in the applicable area of the display.

Advantageously, the video playback device that employs the disclosed font patching technique addresses various limitations of conventional devices. More specifically, conventional video playback devices require that a font file be writable in order to add character sets to the font file; otherwise, the conventional video playback device cannot store additional character sets in the font file, and consequently, cannot store additional character sets in its memory. As a result, conventional video playback devices must continually perform writes to disk to modify and/or overwrite the font file. Alternatively, if the font file cannot be modified and/or overwritten, the conventional video playback device is more likely to render text strings that include un-defined glyphs. By contrast, the video playback device that employs the font patching technique stores font patch files in read-write memory and is able to retrieve additional character sets without requiring that the main font file be modifiable or writable. Because the video playback device stores additional character sets in multiple font files, the video playback device avoids rendering non-defined characters, as the video playback device is more likely to retrieve characters for a given text string. A video service provider may use video playback devices that employ the disclosed font patching technique to periodically update fonts with additional character sets without modifying font files stored in read-only memory.

Network Infrastructure

FIG. 1 illustrates a network infrastructure 100, according to various embodiments of the invention. As shown, the network infrastructure 100 includes content servers 110, control server 120, and endpoint devices 115, each of which are connected via communications network 105. Network infrastructure 100 is configured to distribute content to content servers 110, and such content is then distributed on demand to endpoint devices 115.

Each endpoint device 115 communicates with one or more content servers 110 (also referred to as "caches" or "nodes") via network 105 to download content, such as textual data, graphical data, audio data, video data, and other types of data. The downloadable content, also referred to herein as a "file," is then presented to a user of one or more endpoint devices 115. In various embodiments, endpoint devices 115 may include computer systems, set-top boxes (STBs), mobile computers, smartphones, tablets, console and handheld video game systems, digital video recorders (DVRs), DVD players, connected digital TVs, dedicated media streaming devices (e.g., the Roku® set-top box), and/or any other technically-feasible computing platform that has network connectivity and is capable of presenting content, such as text, images, audio, and/or video content, to a user.

Each content server 110 could include, for example, a web server, a database (DB), and/or a server application configured to communicate with control server 120 to determine the availability and location of various files that are tracked and managed by control server 120. In various embodiments, each content server 110 may further communicate with cloud services 130 and one or more other content servers 110 in order to "fill" each content server 110 with copies of various files. In addition, content servers 110 may respond to requests for files received from one or more endpoint devices 115. The files may then be distributed from content server 110, or via a broader content distribution network (CDN). In some embodiments, content servers 110 enable a user to authenticate his or, her identity (e.g., using a username and password) in order to access files stored on content servers 110. Although only one control server 120 is shown in FIG. 1, in various embodiments, multiple control servers 120 (e.g., control server 120-1, 120-2, etc.) may be implemented to track and manage files.

In various embodiments, cloud services 130 may include an online storage service (OSS) (e.g., Amazon® Simple Storage Service, Google® Cloud Storage, etc.) in which a catalog of thousands or millions of files is stored and/or accessed in order to fill content servers 110. Cloud services 130 also may provide computing and/or other processing services. Although only one cloud service 130 is shown in FIG. 1, in various embodiments, multiple cloud services 130 (e.g., cloud service 130-1, 130-2, etc.) may be implemented.

Figure 2:
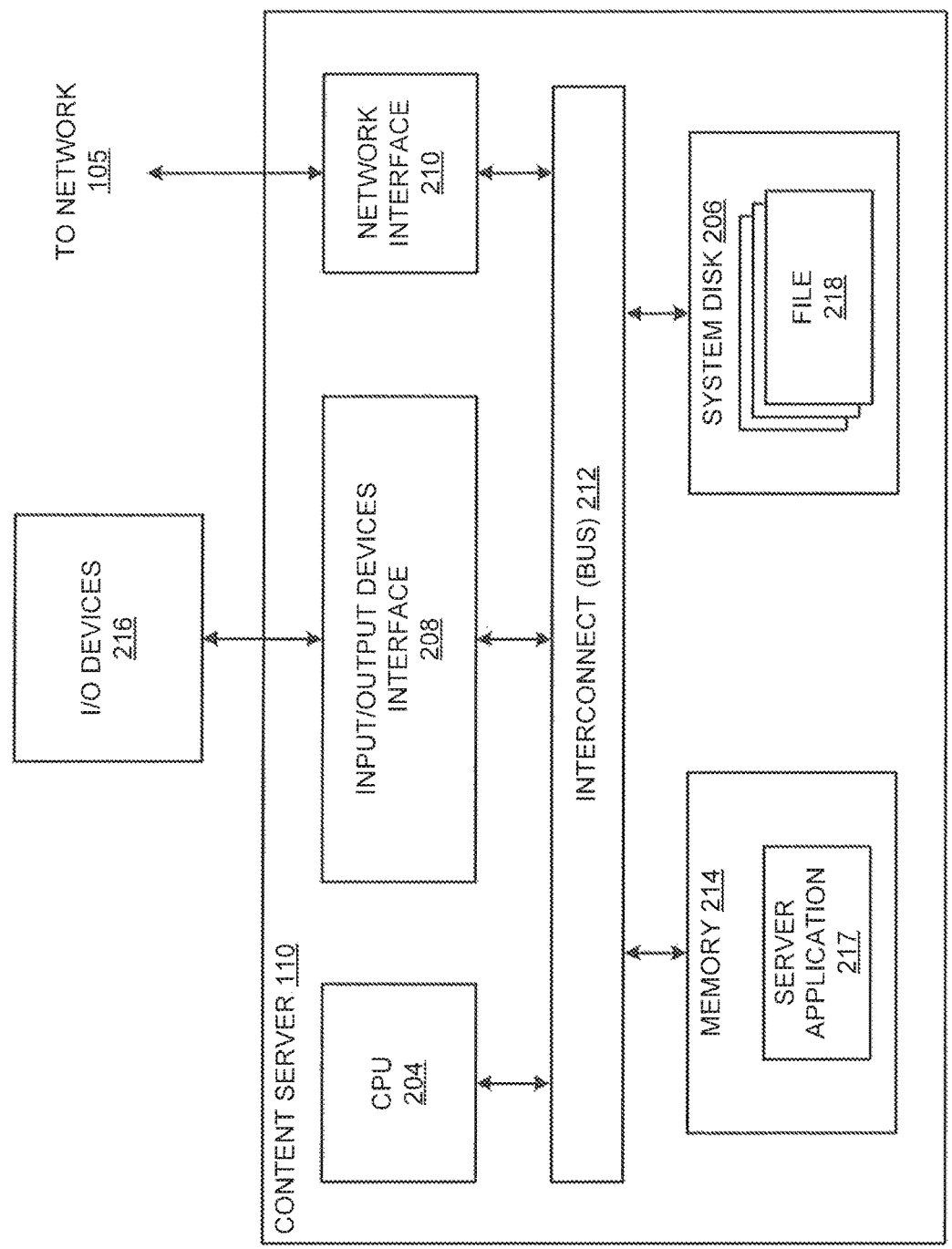
FIG. 2 is a more detailed illustration of the content server of FIG. 1, according to various embodiments of the present invention.

FIG. 2 is a more detailed illustration of content server 110 of FIG. 1, according to various embodiments of the present invention. As shown, content server 110 includes, without limitation, central processing unit (CPU) 204, system disk 206, input/output (I/O) device interface 208, network interface 210, interconnect (bus) 212, and system memory 214.

CPU 204 is configured to retrieve and execute programming instructions; such as server application 217, stored in system memory 214. Similarly, CPU 204 is configured to store application data (e.g., software libraries) and retrieve application data from system memory 214. Interconnect 212 is configured to facilitate transmission of data, such as programming instructions and application data, between CPU 204, system disk 206, I/O device interface 208, network interface 210, and system memory 214. I/O device interface 208 is configured to receive input data from one or more I/O devices 216 and transmit the input data to CPU 204 via interconnect 212. For example, the one or more I/O devices 216 may include one or more buttons, a keyboard, a mouse, and/or other input devices. I/O device interface 208 is further configured to receive output data from CPU 204 via interconnect 212 and transmit the output data to the one or more I/O devices 216.

System disk 206 may include one or more hard disk drives (HDDs), solid-state storage devices (SSDs), and/or similar storage devices. System disk 206 is configured to store nonvolatile data, such as one or more files 218 (e.g., audio files, video files, subtitles, application files, software libraries, etc.). Files 218 can then be retrieved by one or more endpoint devices 115 via network 105. In some embodiments, network interface 210 is configured to operate in compliance with one or more communications standards, such as the Ethernet standard, the Bluetooth standard, and/or one or more wireless communication standards.

System memory 214 includes server application 217, which configures content server 110, to service requests received from endpoint device 115 and other content servers 110. For example, the service request could be for one or more files 218. When server application 217 receives a service request for a specific file, server application 217 retrieves the corresponding file 218 from system disk 206 and transmits file 218 to endpoint device 115 and/or content server 110 via network 105.

File 218 could, for example, be one of a plurality of digital items, such visual content items like videos and/or still images. Similarly, file 218 could be one of a plurality of textual content items associated with one or more visual content items, such as movie metadata. In various embodiments, file 218 may be a one of a plurality of secure application data items associated with one or more content items and/or applications being executed by content server 110, control server 120, and/or endpoint device 115.

Figure 3:
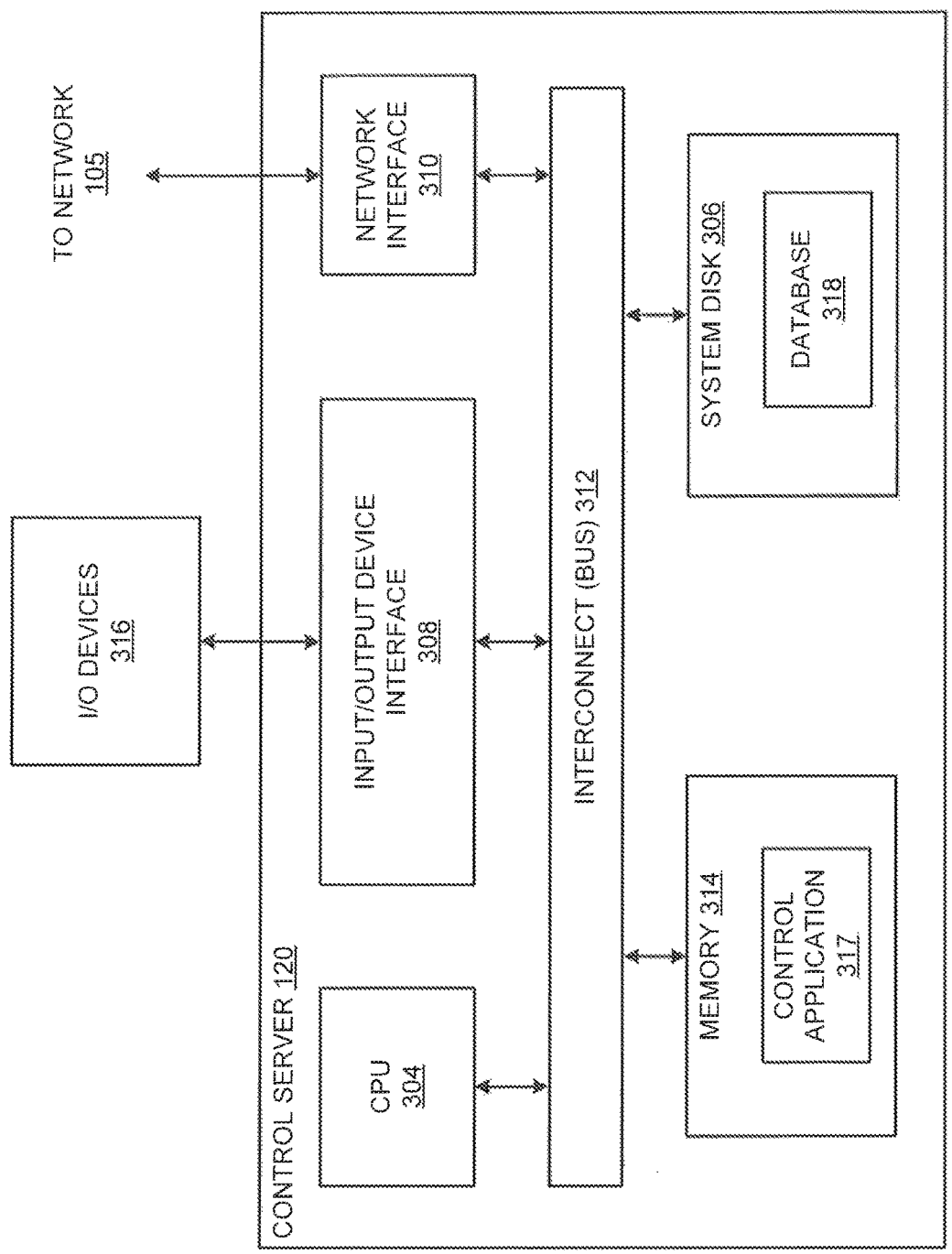
FIG. 3 is a more detailed illustration of the control server of FIG. 1, according to various embodiments of the present invention.

FIG. 3 is a more detailed illustration of control server 120 of FIG. 1, according to various embodiments of the present invention. As shown, control server 120 includes, without limitation, CPU 304, system disk 306, I/O device interface 308, network interface 310, interconnect 312, and system memory 314.

CPU 304 is configured to retrieve and execute programming instructions, such as control application 317, stored in system memory 314. Similarly, CPU 304 is configured to store application data (e.g., software libraries) and retrieve application data from system memory 314 and/or database 318 that is stored in system disk 306. Interconnect 312 is configured to facilitate transmission of data between CPU 304, system disk 306, I/O device interface 308, network interface 310, and system memory 314. I/O device interface 308 is configured to transmit input data and output data between the one or more I/O devices 316 and CPU 304 via interconnect 312. In various embodiments, system disk 306 may include one or more hard disk drives, solid state storage devices, etc. In various embodiments, system disk 206 (shown in FIG. 2) is configured to store database 318 that stores information associated with one or more content servers 110, cloud services 130, and/or files 218.

System memory 314 includes control application 317 configured to access information stored in database 318 and process the information to determine the manner in which specific files 218 will be replicated across content servers 110 included in network infrastructure 100. Control application 317 may further be configured to receive and analyze performance characteristics associated with one or more content servers 110 and/or endpoint devices 115.

In various embodiments, control application 317 may further be configured to transmit one or more font patch files stored in database 318 to endpoint devices 115. For example, endpoint device 115 could send one or more update requests to control server 120 for each font patch file stored in database 318. Control application 317 could be configured to respond to the one or more update requests by identifying one or more font patch files stored in database 318 and sending the one or more font patch files to endpoint device 115. Additionally or alternatively, control application 317 may be configured to transmit one or more font patch files without receiving a request from endpoint device 115. For example control application 317 could be configured to periodically send one or more font patch files to each endpoint device 115 included in network infrastructure 100.

Figure 4:
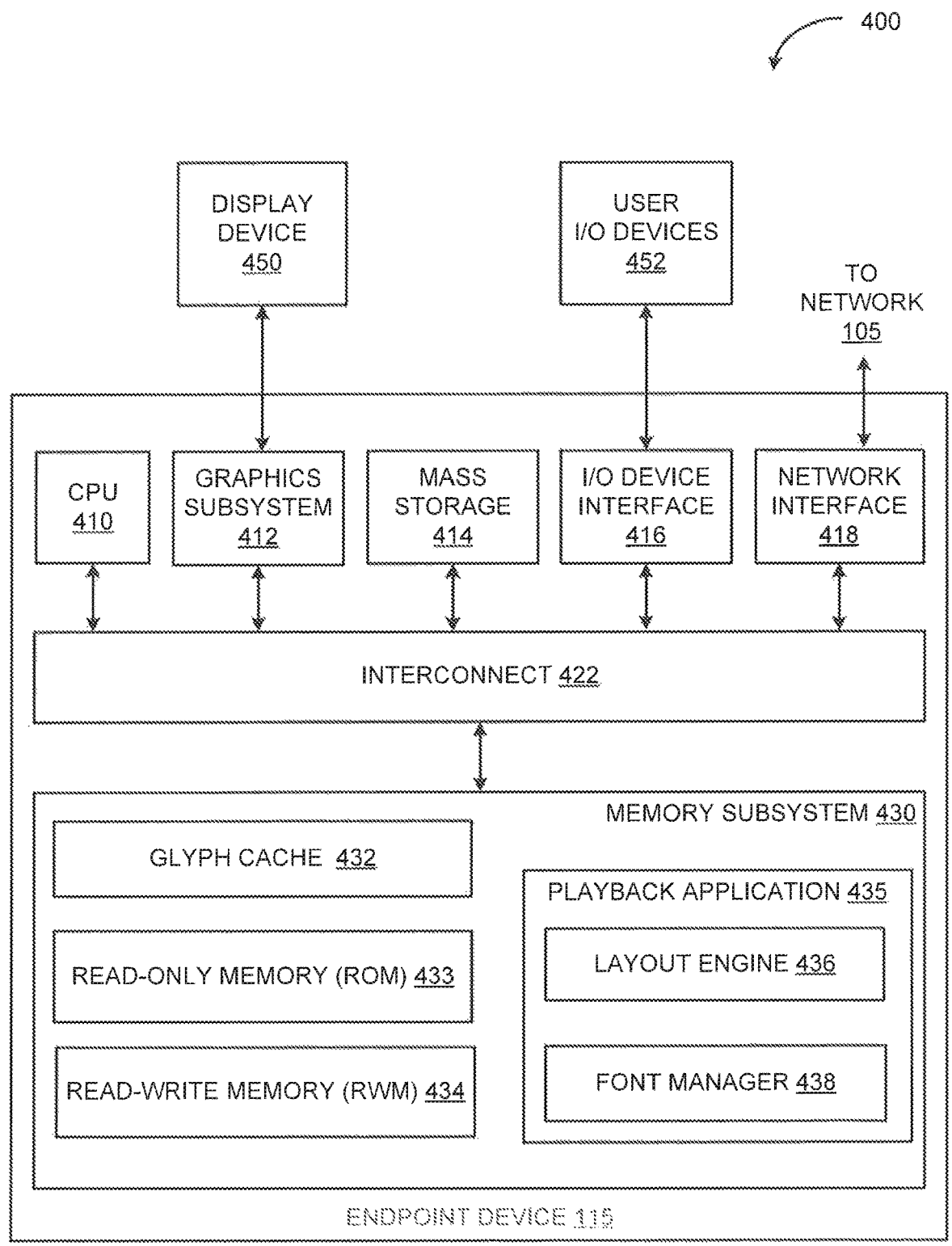
FIG. 4 is a more detailed illustration of the endpoint device of FIG. 1, according to various embodiments of the present invention.

FIG. 4 is a more detailed illustration of endpoint device 115 of FIG. 1, according to various embodiments of the present invention. As shown, endpoint device 400 may include, without limitation, CPU 410, graphics subsystem 412, mass storage unit 414, I/O device interface 416, network interface 418, interconnect 422, and memory subsystem 430.

In some embodiments, CPU 410 is configured to retrieve and execute programming instructions stored in memory subsystem 430. Similarly, CPU 410 is configured to store and retrieve application data (e.g., software libraries) residing in the memory subsystem 430. Additionally or alternatively, CPU 410 is configured to store and retrieve data, including content items and/or application data, from mass storage unit 414. Interconnect 422 is configured to facilitate transmission of data, such as programming instructions and application data, between the CPU 410, graphics subsystem 412, mass storage unit 414, I/O devices interface 416, network interface 418, and memory subsystem 430.

Graphics subsystem 412 is configured to generate frames of video data and transmit the frames of video data to display device 450. In various embodiments, graphics subsystem 412 may be integrated, along with CPU 410, into an integrated circuit (IC). Display device 450 may comprise any technically-feasible means for generating an image for display. For example, display device 450 could be fabricated using liquid crystal display (LCD) technology, cathode-ray tube technology, and/or light-emitting diode (LED) display technology. In various embodiments, display device 450 may display one or more graphical user interfaces (GUIs).

Mass storage unit 414 can include, for example, a hard disk drive and/or flash-memory storage drive, and is configured to store nonvolatile data. For example, mass storage unit 414 could store one or more files 218, such as content items and/or application data. In various embodiments, endpoint device 115 may copy one or more files 218 stored in memory subsystem 430 (e.g., secure application data) to mass storage unit 414.

Input/output (I/O) device interface 416 is configured to receive input data from user one or more I/O devices 452 and transmit the input data to CPU 410 via interconnect 422. For example, user I/O device 452 may comprise one of more buttons, a keyboard, and a mouse or other pointing device. In various embodiments, I/O device interface 416 also includes an audio output unit configured to generate an electrical audio output signal. In such instances, user I/O device 452 may include an audio output device, such as headphones and/or a loudspeaker, configured to generate an acoustic output in response to the electrical audio input signal. Additionally or alternatively, display device 450 may include the loudspeaker. Examples of suitable devices known in the art that can display video frames and generate an acoustic output include televisions, smartphones, smartwatches, electronic tablets, etc.

Network interface 418 is configured to transmit and receive packets of data via network 105. In some embodiments, network interface 418 is configured to communicate using at least one of the Ethernet standard, the Bluetooth standard, and/or one or more wireless communication standards. Network interface 418 is coupled to CPU 410 via interconnect 422.

Memory subsystem 430 includes various portions of memory, programming instructions, and/or application data. In various embodiments, memory subsystem may include glyph cache 432, read-only memory (ROM) 433, read-write memory (RWM) 434, and playback application 435. Playback application 435 includes layout engine 436 and font manager 438.

Glyph cache 432 is a portion of volatile memory that stores files 218, such as one or more glyphs included in character sets stored in ROM 433 and/or RWM 434. Glyph cache 432 stores one or more glyphs retrieved by font manager 438 from various character sets stored in font files. In various embodiments, font manager 438 may initially retrieve a glyph from a font file stored in ROM 433 and/or RWM 434 and may store the retrieved glyph as a file 218 in glyph cache 432. In some embodiments, font manager may pre-load glyph cache 432 by retrieving a group of glyphs from font files included in ROM 433 and/or RWM 434 and storing the group of glyphs as retrieved glyphs. Additionally or alternatively, font manager 438 may search glyph cache 432 for a glyph corresponding to a specific character before searching font files stored in ROM 433 and/or RWM 434.

Read-only memory (ROM) 433 is a portion of nonvolatile memory that is not modified by playback application 435. For example, ROM 433 may store various firmware, such as main font files, that are not modified and/or overwritten. In various embodiments, one or more files 218 may initially be written to ROM 433 and remain unchanged. Read-write memory (RWM) 434 is a portion of computer memory that is written to and read from by playback application 435. For example, playback application 435 could write various files 218 into RWM 434, such as content items and/or font files, in RWM 434. In various embodiments, RWM 434 may be a portion of mass storage 414.

Playback application 435 performs various playback functions associated with content items, such as displaying a GUI for content item selection and video playback of specific multimedia content items. The GUI employs a window-and-object metaphor to provide a mechanism for user interaction with endpoint device 115. Persons skilled in the art will recognize various operating systems and/or user interfaces that are suitable for incorporation into playback application 435. Playback application 435 is configured to request and/or receive content (e.g., one or more files 218) from content server 110 via network interface 418. Further, playback application 435 is configured to interpret the content and present the content via display device 450 and/or user I/O devices 452.

Layout engine 436 included in playback application 435 renders text strings for display via display device 450. In various embodiments, playback application 435 may execute layout engine 436 in order to render the text string by arranging or more glyphs corresponding to characters in a layout for display in a portion of display device 450.

Font manager 438 included in playback application 435 retrieves one or more glyphs corresponding to characters included in a text string. In various embodiments, playback application 435 executes font manager 438 in order to search various portions of memory in order to retrieve one or more glyphs that are provided to layout engine 436. For example, font manager 438 may search one or more glyphs included in glyph cache 432 and/or one or more font files stored in ROM 433 and/or RWM 434 in order to locate and retrieve a glyph that corresponds to a given character in a text string. In various embodiments, layout engine 436 may transmit a text string to font manager 438 and, in response, font manager 438 may transmit a separate glyph that corresponds to each character in the text string.

Techniques for Text Rendering Using Font Patching

In some instances, playback application 435 may attempt to render a text string by searching a font file stored in ROM 433 in order to retrieve one or more glyphs that correspond to characters in the text string and arranging the glyphs in a specific layout. However, in some instances, playback application 435 may search for a character set corresponding to a specific character in the text string and may not find the corresponding character set in the font file stored in ROM 433. In such instances, playback application 435 may render the text string using an undefined glyph for the specific character.

To address this problem, endpoint device 115 employs a font patching technique to store one or more font patch files in RWM 434 in addition to the font file stored in ROM 433. In particular, the technique involves endpoint device 115 receiving, from control server 120, a font patch file that is associated with the font file stored in ROM 433. Endpoint device 115 stores the font patch file in RWM 434 and does not modify or overwrite the font file stored in ROM 433. When playback application 435 attempts to render a text string, playback application 435 searches one or both the font file stored in ROM 433 and the font patch file stored in RWM 434 for the corresponding character set.

In various embodiments, when a character set corresponding to a given character in a text string is not included in the font file stored in ROM 433, playback application 435 searches the font patch file stored in RWM 434. If the character set is available in the font patch file, then playback application 435 retrieves the glyph associated with the character from the corresponding character set. Playback application 435 renders the text string using a group of glyphs retrieved from character sets included in the font patch file stored in RWM 434 and/or character sets included in the font file stored in ROM 433. Endpoint device 115 therefore reduces the number of instances where Playback application 435 renders a text string using an un-defined glyph.

Figure 5:
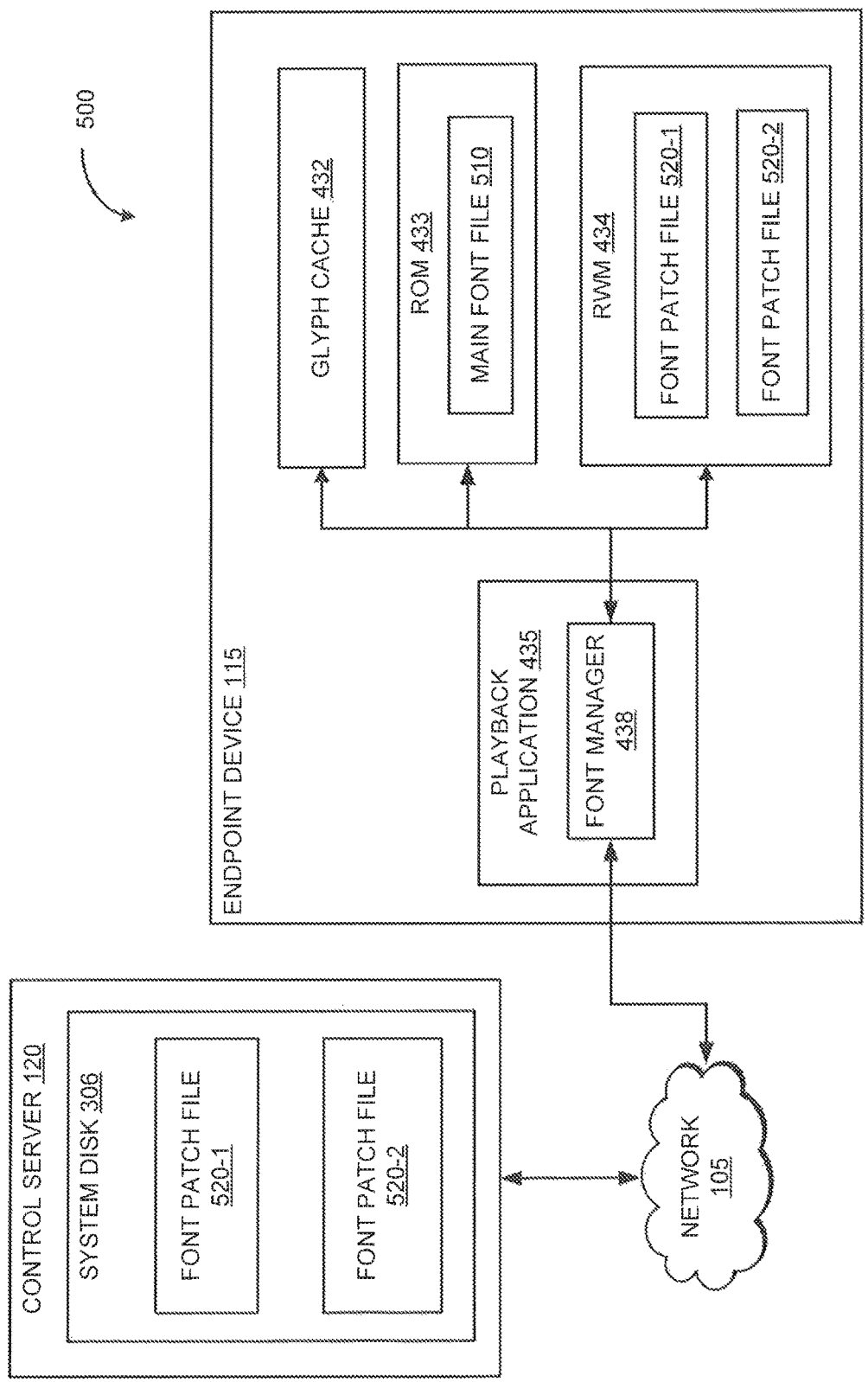
FIG. 5 illustrates a technique of storing a font patch file within the network infrastructure of FIG. 1, according to various embodiments of the present invention.

FIG. 5 illustrates a technique of storing a font patch file within the network infrastructure of FIG. 1, according to various embodiments of the present invention. As shown, network infrastructure 500 includes network 105, endpoint device 115, and control server 120. System disk 306 stores multiple font patch files 520 (e.g., 520-1, 520-2). Endpoint device 115 includes ROM 433 that stored main font file 510 and RWM that stores multiple font patch files 520.

In operation, playback application 435 included in endpoint device 115 sends one or more requests for font patch files 520 to control server 120. Control server 120 responds to the requests by retrieving one or more font patch files 520 stored in system disk 306 and sending copies of the one or more font patch files 520 to endpoint device 115 via network 105. Additionally or alternatively, control server 120 may send font patch file 520 without receiving a request from endpoint device 115. Endpoint device 115 stores the received copies of the one or more font patch files 520 in RWM 434.

Main font file 510 includes a grouping of character sets for a given font. A character set for a given character includes character data, such as one or more glyph identifiers for the character and a glyph for the character. In various embodiments, the character set may include additional character data, such as a character group data that identifies the subgroup to which the character set is a member (e.g., currency symbols, mathematical operations, etc.), In various embodiments, a font may include multiple character sets that include different glyphs in various style of the font (e.g., capital letter, italic, bold, superscript, etc.).

In various embodiments, the grouping of character sets included in main font file 510 includes the most frequently-used characters for a font. For example, main font file 510 for a Times New Roman English font could include character sets for each English letter, Arabic numerical, and basic punctuation mark. In another example, a Chinese Sans font may include a grouping of character sets corresponding to the 2,000 most-frequently used Chinese characters. In various embodiments, endpoint device 115 writes main font file 510 to ROM 433, In such instances, the grouping of character sets included in main font file 510 is not modified once the main font file 510 is written to ROM 433.

Font patch file 520 includes a grouping of character sets for a font that is different than the grouping of character sets included in main font file 510. In various embodiments, none of the character sets included in font patch file 520 are included in main font file 510. For example, main font file 510 for the Chinese Sans font may include a first grouping of character sets corresponding to a base set of traditional Chinese characters, and font patch file 520 may include a supplemental grouping of character sets corresponding to a supplemental set of Chinese slang characters.

In various embodiments, endpoint device 115 may store multiple font patch files 520 in RWM 434. For example, endpoint device 115 could initially receive and store font patch file 520-1. After two weeks, endpoint device 115 could then receive and store font patch file 520-2. In some embodiments, endpoint device 115 may receive metadata associated with one or more font patch files 520. For example, the metadata could specify the search order in which font manager 438 is to search main font file 510 and/or font patch files 520-1, 520-2 when rendering a text string. In such instances, font manager 438 may update a priority list to reflect the search order.

Additionally or alternatively, the metadata may include a specific, finite time period for endpoint device 115 to store a specific font patch file 520-2. For example, font patch file 520-2 may be a holiday font associated with main font file 510. Control server 120 may send metadata associated with font patch file 520-2 that specifies that font patch file 520-2 is higher on the priority list, which causes font manager 438 to search font patch file 520-2 before main font file 510. The metadata may also specify that endpoint device 115 is to erase font patch file 520-2 at a specific date. In various embodiments, the metadata may specify the next time for endpoint device 115 to send a request to control server 120 for additional font patch files 520.

Figure 6:
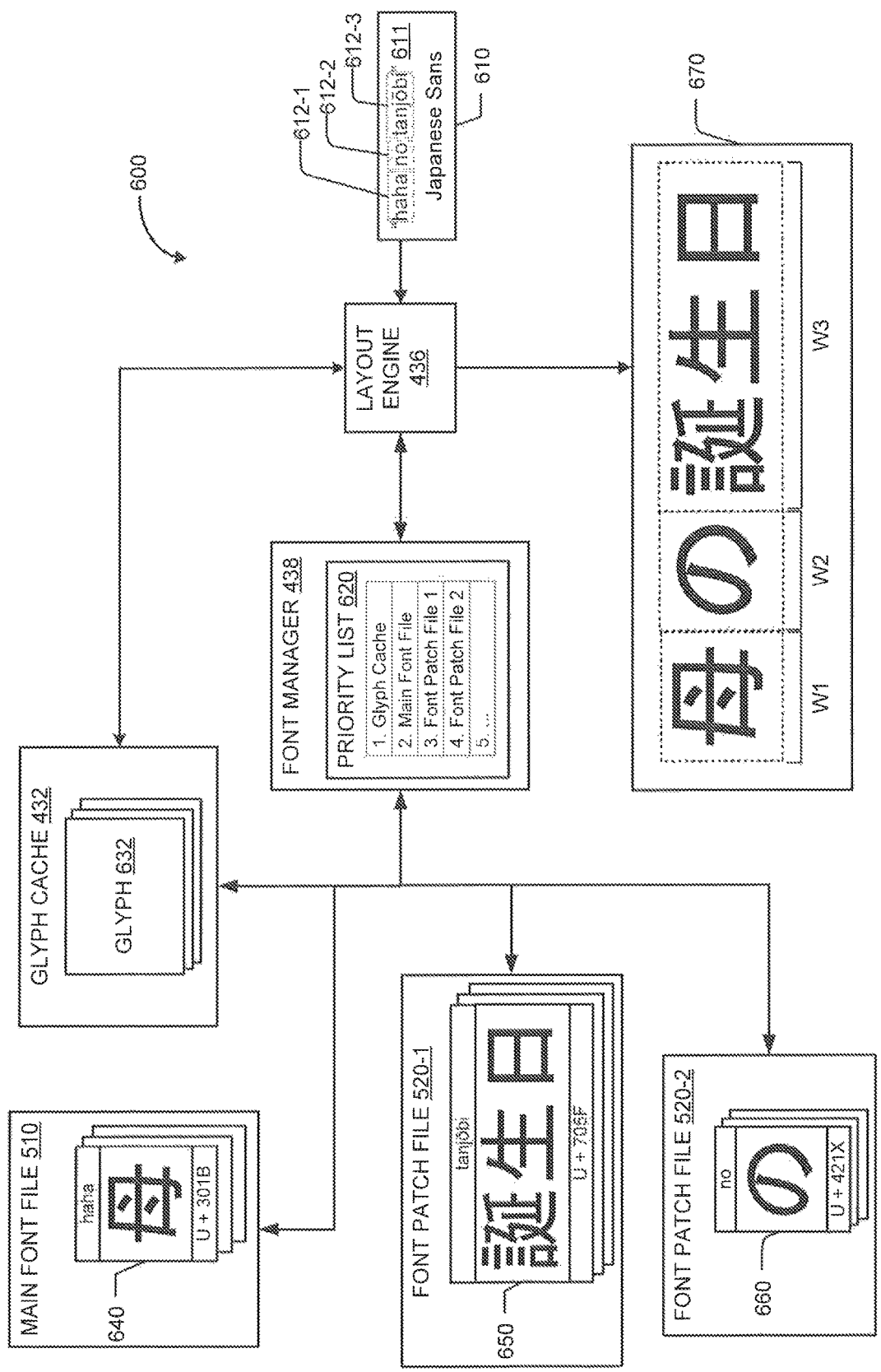
FIG. 6 illustrates a technique of rendering a text string using one or more font patch files of FIG. 5, according to various embodiments of the present invention.

FIG. 6 illustrates a technique of rendering a text string using one or more font patch files of FIG. 5, according to various embodiments of the present invention. As shown, endpoint device 600 includes text string command 610, layout engine 436, font manager 438, glyph cache 432, main font file 510, font patch files 520-1, 520-2, and display order 670 of the rendered text string.

In operation, layout engine 436 receives a text string command 610 to render text string 611 in a specific font. Layout engine 436 sends text string command 610 to font manager 438. Font manager 438 receives text string command 610 and identifies each character 612 (e.g., 612-1, 612-2, 612-3) included in text string 611. For a given character 612-1, font manager 438 searches one or more of glyph cache 432, main font file 510, and/or font patch files 520-1, 520-2 in order to find a character set 640 that corresponds to character 612-1. The order in which font manager 438 searches glyph cache 432, main font file 510, and/or font patch files 520 may be determined based on priority list 620. Upon finding the corresponding character set 640, font manager 438 retrieves the glyph included in character set 640 and sends the retrieved glyph to layout engine 436, Layout engine 436 places the retrieved glyph in display order 670 to be rendered as text when displayed via display device 450.

Details regarding various embodiments of text string command 610, priority list 620, glyph cache 432, main font file 510, font patch files 520, and display order 670 are provided below.

Text string command 610 includes data that specifies text string 611 to be rendered in a specific font. Text string 611 includes one or more individual characters 612. For example, a content provider may specify a text string for a title of a specific content item. In such instances, layout engine 436 could receive text string command 610 that includes text string 611 for the title and a specific font in which text string 611 is to be rendered. Text string 611 includes one or more characters 612 that layout engine 436 is to render. For example, text string 611 "haha no tanjōbi" could include three characters when layout engine 436 renders text string 611 in a Japanese Sans font. Similarly, text string 611 "haha no tanjōbi" could include 16 characters (e.g., 3 "a" characters, two "h" characters, two space characters, etc.) when layout engine 436 renders text string 611 in a Times New Roman English font.

Priority List 620 is an ordered list that specifies the search order of memory locations and/or font files that font manager 438 searches when finding character sets for a specific font that correspond to a character 612 included in text string 611. In various embodiments, font manager 438 may include multiple priority lists 620 for each specific font. For example, font manager 438 may include a first priority list 620-1 for the Japanese Sans font and a second priority list 620-2 for the Times New Roman English font. Additionally or alternatively, font manager 438 may create and/or modify priority list 620 upon receiving one or more font patch files 520. For example, font manager 438 could receive metadata associated with font patch file 520-2 that specifies that font patch file 520-2 is to be searched after font patch file 520-1. Font manager 438 could update priority list 620 based on the received metadata by placing font patch file 520-2 after font patch file 520-1 in the search order.

Glyphs 632 in glyph cache 432 include one or more glyphs that were retrieved by font manager 438 and/or rendered by layout engine 436. For example, when font manager 438 locates character set 640 and retrieves the glyph included in character set 640, font manager 438 and/or layout engine 436 could send a copy of the glyph to glyph cache 432, where the copy is stored as glyph 632. In some embodiments, font manager 438 may search glyph cache 432 for one or more glyphs 632 corresponding to characters included in text string 611 before searching main font file 510 and/or font patch files 520-1, 520-2. Additionally or alternatively, font manager 438 may pre-load glyph cache 432 with a group of glyphs 632 before receiving text string 611. For example, font manager may retrieve the 100 most frequently-used glyphs from one or more of main font file 510 and/or font patch file 520-1, 520-2, and may store the retrieved glyphs as separate glyphs 632 (e.g., 632-1 to 632-100).

Each character set 640, 650, 660 includes character data associated with a specific character. The character data included in character set 640, 650, 660 includes a glyph for the character and one or more glyph identifiers for the character. For example, character set 660 corresponds to character 612-2 and includes two glyph identifiers: a character identifier ("no") and a Unicode identifier ("U+421X"). In various embodiments, font manager 438 may search the character data to identify the character set corresponding to a specific character. For example, font manager 438 could search the character identifier and/or Unicode identifier in order to identify character set 660. In various embodiments, the character set may include additional character data, such as a character group data that identifies the subgroup to which the character set is a member, Unicode Transformation Format code sequence and Universal Coded Character Set sequence, and so forth.

Each of main font file 510 and/or font patch files 520-1, 520-2 stores groupings of character sets for a given font. For example, main font file 510 and font patch files 520-1, 520-2 store groupings of character sets 640, 650, 660 for the Japanese Sans font. When font manager 438 is unable to find in main font file 510 a character set 640 that corresponds to character 612-2, font manager 438 may, based on the search order specified by priority list 620, search font patch file 520-1 and/or font patch file 520-2 until the applicable character set 660 is located.

In various embodiments, priority list 620 may specify other font files to search beyond the font files 510, 520-1, 520-2 associated with the specific font. For example, priority list may specify one or more font files associated with the Times New Roman English font to search after searching font patch file 520-2. In some embodiments, font manager 438 may search each font file stored in endpoint device 115 for a corresponding character set before determining that no corresponding character set is stored in endpoint device 115. In such instances, font manager 438 may retrieve a non-defined glyph ("tofu") in place of a corresponding glyph for the character.

Display order 670 specifies the arrangement of retrieved glyphs 632 for a rendered text string. Layout engine 436 receives from font manager 438 a set of glyphs that correspond to the characters 612 included in text string 611. Layout engine 436 generates display order 670 that specifies the order in which the retrieved glyphs 632 are to be rendered via display device 450. In various embodiments, each retrieved glyph 632 includes additional information that layout engine 436 uses to render the text string. For example, each retrieved glyph may have and associated width (e.g., W1, W2, and W3) that layout engine uses to ensure that the text string fits within a specific area of the display device 450. For example, layout engine 436 could generate display order 670 and could check the combined widths of W1+W2+W3 to determine whether display order 670 fits within a specific area for the rendered text string. In instances where display order 670 cannot all be rendered, such as when the width of the text string is larger than the designated display area, layout engine 436 may cause only a portion of display order 670 to be rendered at given time. For example, layout engine 436 may split a rendered text string into two portions and may cycle the display of the rendered text within the designated display area.

Figure 7:
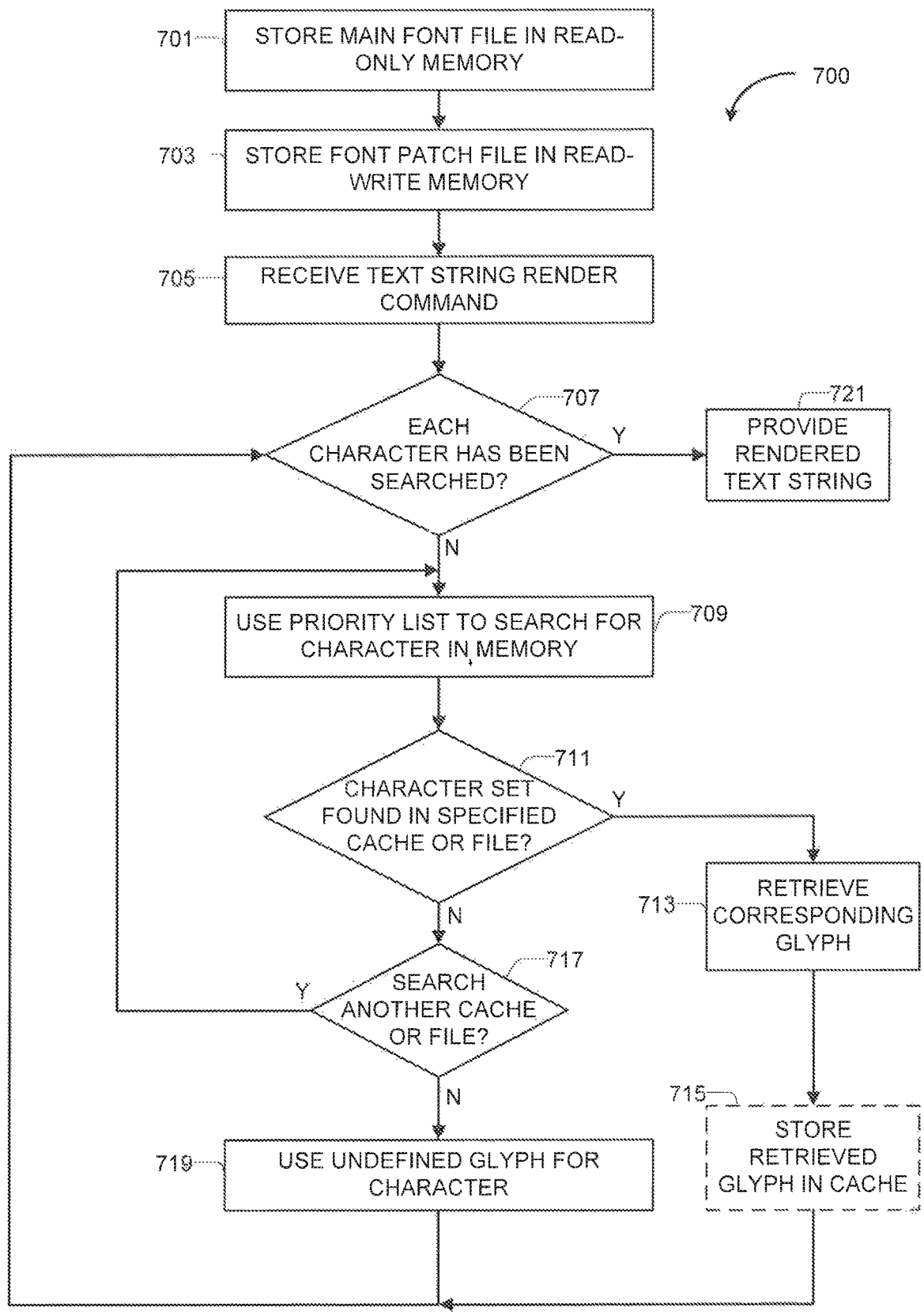
FIG. 7 is a flow diagram of method steps for text rendering using font patching, according to various embodiments of the present invention.

FIG. 7 is a flow diagram of method steps for text rendering using font patching, according to various embodiments of the present invention. Although the method steps are described with reference to the systems of FIGS. 1-6 and 8, persons skilled in the art will understand that any system configured to implement the method steps, in any order, falls within the scope of the present invention.

As shown, method 700 begins at step 701, where endpoint device 115 stores main font file 510 in ROM 433. For example, main font file 510 could be a portion of firmware that is stored in ROM 433 during initial manufacture of endpoint device. Endpoint device 115 writes main font file 510 to ROM 433, where main font file 510 is not modified.

At step 703, endpoint device 115 stores font patch file 520 in RWM 434. In various embodiments, playback application 435 included in endpoint device 115 sends a request for font patch file 520 to control server 120. Control server 120 responds to the requests by retrieving one font patch files 520 and sending a copy of font patch file 520 to endpoint device 115 via network 105. Additionally or alternatively, control server 120 may periodically send font patch file 520 without receiving a request from endpoint device 115. Endpoint device 115 stores the received copy of font patch file 520 in RWM 434. In various embodiments, endpoint device 115 may store multiple font patch files 520 in RWM 434. In such instances, font manager 438 included in playback application 435 may search one or more of the multiple font patch files 520 in order to identify a character set corresponding to a given character 612.

At step 705, endpoint device 115 receives text string command 610 to render a text string. Layout engine 436 included in playback application 435 receives text string command 610, which specifies a text string 611 to render in a specific font. In various embodiments, one or more applications included in endpoint device 115, such as playback application 435 and/or an audiovisual program received by endpoint device 115 may generate one or more text string commands 610 to layout engine 436 in order to cause layout engine to render the text string 611 via display device 450. In various embodiments, text string command 610 specifies the font corresponding to main font file 510 and/or font patch file 520.

At step 707, endpoint device 115 determines whether a search has been performed for each character 612 included in text string 611. Font manager 438 included in playback application 435 receives text string 611 from layout engine 436. For each character 612 included in text string 611, font manager 638 determines whether a search has been conducted to retrieve glyph 632 from a corresponding character set 640, 650, 660. When font manager 438 determines that a search has been conducted on each character 612 included in text string 611, endpoint device 115 proceeds to step 721; otherwise font manager 438 selects a character 612-2 for which a search has not yet been conducted and proceeds to step 709.

At step 709, endpoint device 115 uses priority list 620 to identify a portion of memory and/or a file to search for a character set 640, 650, 660 that corresponds to a given character 612 included in text string 611. Font manager 438 refers to priority list 620 in order to identify a portion of memory, such as glyph cache 432, or font file, such as main font file 510 and/or font patch files 520-1, 520-2 in which to conduct a search. In various embodiments, font manager 438 may update priority list 620 to include font patch files 520-1, 520-2 as endpoint device 115 stores font patch files 520-1, 520-2 in RWM 434. In some embodiments, font manager 438 may receive metadata from control server 120 that relates to the search order and may update the search order included in priority list 620 to reflect the metadata.

Priority list 620 specifies the search order in which glyph cache, main font file 510, and/or font patch files 520-1, 520-2 are searched by font manager 438 when attempting to locate a character set that corresponds to the selected character 612-1. In various embodiments, priority list 620 may include font files for other fonts, such as font files for different typefaces, different styles, and/or different languages. In such instances, font manager 438 may proceed to search each font file listed in priority list in order to identify the corresponding character set.

In various embodiments, font manager 438 may search the character data of each character set 640 in order to identify a character set that corresponds to a specific character. For example, font manager 438 could search the character identifier and/or Unicode identifier in each character set 640 in order to determine whether the information matches or is associated with selected character 612-2.

At step 711, endpoint device 115 determines whether a corresponding character set 640 for the given character 612 was found in the specific portion of memory or file. Font manager 438 determines whether the grouping of character sets 640 included in the memory location or font file selected in step 709 includes the corresponding character set. For example, font manager 438 could determine, upon searching the grouping of character sets 640 included in main font file 510, that main font file 510 does not include a character set corresponding to selected character 612-2. When font manager 438 determines that the corresponding character set was found, endpoint device proceeds to step 713; otherwise font manager 438 determines that the corresponding character set was not found and proceeds to step 717.

At step 713, endpoint device 115 retrieves glyph 632 from the corresponding character set 640. Font manager 438, upon determining that a character set 640 corresponding to selected character 612-1 was found, retrieves glyph 632 included in character set 640. At step 715, endpoint device 115 optionally stores glyph 632 in glyph cache 432. For example, upon initial retrieval of glyph 632 from main font file 510 and/or font patch file 520-1, 520-2, font manager 438 could store a copy of glyph 632 in glyph cache 432. In such instances, font manager 438 and/or layout engine 436 may retrieve glyph 632 from glyph cache 432 before performing searches on any of the font files. Upon optionally storing glyph 632, endpoint device 115 returns to step 707, where font manager 438 determines whether any unsearched characters remain.

Referring to step 717, endpoint device 115 determines whether to search another portion of memory and/or file for a corresponding character set to the given character 612. Font manager 438, upon determining in step 711 that a character set corresponding to the selected character 612-2 was not stored in the selected portion of memory or font file, determines whether priority list 620 includes additional memory locations and/or font files to search. When font manager 438 determines that priority list 620 includes at least one additional portion of memory or font file to search, endpoint device 115 returns to step 709, where font manager 438 selects the next portion of memory or font file listed in priority list 620. Otherwise, font manager 438 determines that there are no remaining portions of memory or font files to search and proceeds to step 719.

At step 719, endpoint device 115 uses an un-defined glyph for the given character. Upon determining no portions of memory or font files include a character set that corresponds to the selected character 612-2, font manager 438 uses an un-defined glyph for the selected character. In such instances, layout engine 436 uses the un-defined glyph for the character when rendering the text string. Upon selecting the un-defined glyph for selected character 612-2, font manager 438 returns to step 707, where font manager 438 determines whether any unsearched characters remain.

Referring to step 721, endpoint device 115 provides the rendered text string. Upon determining that searches have been performed for all characters in text string 611, font manager 438 sends each of the retrieved glyphs 632 to layout engine 436. Layout engine 436 prepares text string 611 for rendering by arranging the retrieved glyphs 632. Layout engine 436 arranges the retrieved glyphs 632 in display order 670 that corresponds to text string 611. Upon preparing display order 670, layout engine 436 provides the rendered text by causing display device 450 to render display order in an applicable area of the screen.

Figure 8:
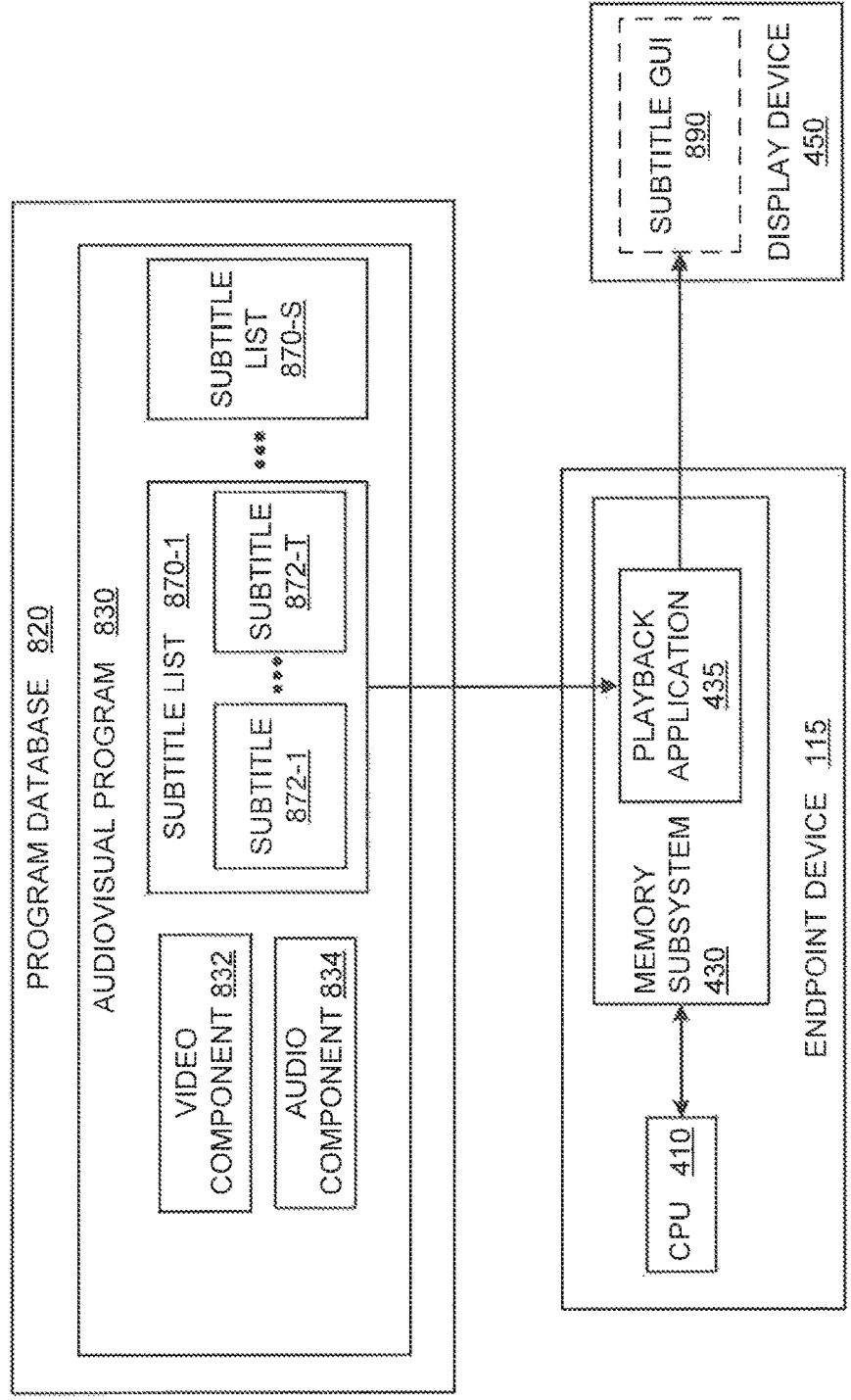
FIG. 8 illustrates an example technique of rendering the text string of a subtitle using one or more font patch files of FIG. 5, according to various embodiments of the present invention.

FIG. 8 illustrates an example technique of rendering the text string of a subtitle using one or more font patch files of FIG. 5, according to various embodiments of the present invention. As shown, system 800 includes, without limitation, program database 820, endpoint device 115, and display device 450.

In operation, playback application 435 receives one or more subtitles 872-1 to 872-T from audiovisual program 830. For each subtitle 872, playback application 435 generates one or more text string commands 610, and layout engine 436 renders the text included in subtitle 872 to be displayed in display device 450 within a portion of subtitle GUI 890. In various embodiments, playback application 435 can receive other text from audiovisual program 830. For example, audiovisual program 830 could include one or more titles or descriptions that are sent to playback application 435. In such instances, playback application 435 can execute layout engine 436 and/or font manager 438 in order to render the text for display via display device 450.

As shown, the program database 820 includes, without limitation, any number of the audiovisual programs 830. Examples of audiovisual programs 830 include feature-length films, episodes of television programs, music videos, and so forth. Each audiovisual program 830 includes video component 832, audio component 834, one or more subtitle lists 870.

Visual component 832 includes any number of different shot sequences, where each shot sequence includes a set of frames that usually have similar spatial-temporal properties and run for an uninterrupted period of time. Each frame included in video component 832 is related to a particular time during the playback of audiovisual program 830. Audio component 834 includes audio content (i.e., spoken dialog and/or other sounds) associated with audiovisual program 830. In various embodiments, one or more portions of audio component 834 are synchronized to video component 832.

Subtitle lists 870 enable viewers to follow audio component 834 of audiovisual program 830 by reading text that corresponds to the audio component 834. For example, each subtitle list 870 could be associated with a specific language and could include any number of subtitles 872-1 to 872-T associated with the specific language. For example, subtitle list 870-1 could T number of include English subtitles 872, while subtitle list 870-2 could include French subtitles, subtitle list 870-3 could include Japanese subtitles 872, and so forth.

While the viewer is watching video component 832 of audiovisual program 830 via display device 450, the viewer also reads subtitles 872-1 to 872-T displayed in a subtitle area of display device 450. For example, playback application 435 could execute layout engine 436 and/or font manager 438 in order to render text that is displayed in subtitle GUI 890. In various embodiments, a provider, such as a professional subtitler, may generate portions of subtitle 872, including one or more text strings, a subtitle start time, and a subtitle end time. In such instances, the text string(s) corresponds to a particular portion of the spoken dialog, while the subtitle start and the subtitle end times designate an interval of time during playback of the audiovisual program 830 when the text is displayed in subtitle GUI 890.

In sum, an endpoint device in a network infrastructure employs a font patching technique to store multiple font files associated with a given font. The multiple font files include a main font file stored in read-only memory and one or more font patch files stored in read-write memory. Once a main font file is stored in read-only memory, the endpoint device subsequently receives one or more font patch files that are associated with the given font. The endpoint device stores the font patch files in read-write memory and links the main font file with the font patch files.

A video playback application includes a font manager and a layout engine. The layout engine receives a command to render a text string in an area of a display device. The layout engine sends the text string to the font manager. For each character included in the text string, the font manager performs a lookup of the character. The lookup includes searching portions of memory and/or font files to find a character set that corresponds to the character. The font manager uses a priority list that specifies the order in which the portions of memory and/or font files are searched. In various embodiments, the font manager may search for the corresponding character set in the main font file. If the corresponding character set is not included in the main font file, then the font manager may search the one or more font patch files for the corresponding character set. In various embodiments, the font manager may perform lookups in related fonts, such as different typefaces for the same language and/or fonts for different languages. When the font manager locates the corresponding character set, the font manager retrieves the glyph included in the character set. The font manager sends the retrieved glyph to the layout engine. The layout engine uses each glyph received from the font manager to render the text string. The layout engine sends the rendered text string to be displayed in the applicable area of the display.

At least one technological advantage of the disclosed techniques is that a video playback device is able to store various files containing new character sets for a particular font without requiring that a stored font file be modified or overwritten. In particular, by linking a stored font file with one or more font patch files, a video playback device can add character sets associated with a given font without modifying a font file that is stored in read-only memory. Because the video playback device stores an expanded group of character sets for a specific font, the video playback device avoids rendering text strings with non-defined glyphs, as the video playback device is more likely to retrieve glyphs for each character a given text string.

1. In some embodiments, a computer-implemented method for rendering characters for display comprises receiving, subsequent to a first font file being stored in read-only memory, a first font patch file for storage in read-write memory, where each of the first font file and the first font patch file is associated with a first font, each of the first font file and the first font patch file includes a different set of glyphs that is used to render characters for display, and a first set of glyphs included in the first font file is static, determining that a first text string includes a first set of characters that is to be rendered, retrieving, from at least one of the first font file and the first font patch file depending on whether a first glyph is included in the first set of glyphs, the first glyph corresponding to a first character included in the first set of characters, and rendering at least a portion of the first text string using the first glyph.

2. The computer-implemented method of clause 1, further comprising rendering the first text string using a second set of glyphs, where each glyph included in the second set of glyphs corresponds to a character included in the first set of characters.

3. The computer-implemented method of clause 1 or 2, where retrieving the first glyph comprises searching one or more character sets included in at least one of the first font file and the first font patch file, identifying a first character set that corresponds to the first character, and retrieving the first glyph from the first character set.

4. The computer-implemented method of any of clauses 1-3, further comprising determining that a first priority list specifies that the first font file is to be searched before the first font patch file, and searching one or more character sets included in the first font file for a first character set that corresponds to the first character.

5. The computer-implemented method of any of clauses 1-4, further comprising determining that the first font file does not include the first character set, determining that the first priority list specifies that the first font patch file is to be searched after the first font file, and searching one or more character sets included in the first font patch file for the first character set.

6. The computer-implemented method of any of clauses 1-5, further comprising storing the first glyph in a first cache.

7. The computer-implemented method of any of clauses 1-6, further comprising determining that a first priority list specifies that the first cache is to be searched before the first font file or the first font patch file, and searching the first cache for a second glyph that corresponds to a second character included in the first set of characters.

8. The computer-implemented method of any of clauses 1-7, further comprising retrieving, from at least one of the first font file or the first font patch file, a second set of glyphs, and storing the second set of glyphs in a first cache.

9. The computer-implemented method of any of clauses 1-8, further comprising sending a request for a second font patch file associated with the first font, and receiving a second font patch file associated with the first font for storage in the read-write memory.

10. The computer-implemented method of any of clauses 1-9, further comprising modifying a first priority list to specify that the second font patch file is to searched before the first font file or the first font patch file.

11. In some embodiments, a device comprises a memory subsystem comprising read-write memory, and read-only memory that stores a first font file, and a processor coupled to the memory subsystem that receives a first font patch file for storage in the read-write memory, where each of the first font file and the first font patch file is associated with a first font, each of the first font file and the first font patch file includes a different set of glyphs that is used to render characters for display, and a first set of glyphs included in the first font file is static, determines that a first text string includes a first set of characters that is to be rendered, determines that a first priority list specifies that the first font file is to be searched before the first font patch file, upon searching at least the first font file, retrieves, from at least one of the first font file and the first font patch file depending on whether a first glyph is included in the first set of glyphs, the first glyph corresponding to a first character included in the first set of characters, and renders at least a portion of the first text string using the first glyph.

12. The device of clause 11, where the memory subsystem further comprises a first cache that stores at least the first glyph.

13. The device of clauses 11 or 12, where the processor further retrieving, from at least one of the first font file or the first font patch file, a second set of glyphs, and storing the second set of glyphs in a first cache.

14. The device of any of clauses 11-13, where the read-only memory stores a second font file associated with a second font, and the processor further determines that the first font file does not include the first character set, determines that the first priority list specifies that the second font file is to be searched after the first font file, and searches one or more character sets included in the second font patch file for the first character set.

15. The device of any of clauses 11-14, where the processor further receives a second font patch file for storage in the read-write memory, wherein the second font patch file is associated with the first font, and modifies the first priority list to specify that the second font patch file is to be searched before the first font file or the first font patch file.

16. The device of any of clauses 11-15, where the first font patch file is stored in read-write memory for a finite period.

17. The device of any of clauses 11-16, where retrieving the first glyph from at least one of the first font file and the first font patch file comprises searching one or more character sets included in at least one of the first font file and the first font patch file, identifying a first character set that corresponds to the first character, and retrieving the first glyph from the first character set.

18. One or more non-transitory computer-readable media storing instructions that, when executed by one or more processors, cause the one or more processors to for rendering characters for display by performing the steps of receiving, subsequent to a first font file being stored in read-only memory, a first font patch file for storage in read-write memory, where each of the first font file and the first font patch file is associated with a first font, each of the first font file and the first font patch file includes a different set of glyphs that is used to render characters for display, and a first set of glyphs included in the first font file is static, determining that a first text string includes a first set of characters that is to be rendered, retrieving, from at least one of the first font file and the first font patch file depending on whether a first glyph is included in the first set of glyphs, the first glyph corresponding to a first character included in the first set of characters, and rendering at least a portion of the first text string using the first glyph.

19. The one or more non-transitory computer-readable media of clause 18, further comprising instructions that, when executed by the one or more processors, cause the one or more processors to perform the steps of determining that a first priority list specifies that the first font file is to be searched before the first font patch file, and searching one or more character sets included in the first font file for a first character set that corresponds to the first character.

20. The one or more non-transitory computer-readable media of clause 18 or 19, further comprising instructions that, when executed by the one or more processors, cause the one or more processors to perform the steps of determining that the first font file does not include the first character set, determining that the first priority list specifies that the first font patch file is to be searched after the first font file, and searching one or more character sets included in the first font patch file for the first character set.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for rendering characters for display, the method comprising:
   receiving, subsequent to a first font file being stored in read-only memory, a first font patch file for storage in read-write memory, wherein:
      each of the first font file and the first font patch file is associated with a first font and a first language,
      the first font file includes a first set of glyphs that is associated with the first font and used to render characters for display,
      the first font patch file includes a second set of glyphs that is associated with the first font and used to render characters for display, wherein the second set of glyphs includes at least one glyph that is not included in the first set of glyphs, and
      the first set of glyphs is static;
   determining that a first text string includes a first set of characters that is to be rendered;
   retrieving, from at least one of the first font file and the first font patch file depending on whether a first glyph is included in the first set of glyphs, the first glyph corresponding to a first character included in the first set of characters; and rendering at least a portion of the first text string using the first glyph.

2. The computer-implemented method of claim 1, further comprising rendering the first text string using a third set of glyphs, wherein each glyph included in the third set of glyphs corresponds to a character included in the first set of characters.

3. The computer-implemented method of claim 1, wherein retrieving the first glyph comprises:
searching one or more character sets included in at least one of the first font file and the first font patch file;
identifying a first character set that corresponds to the first character; and
retrieving the first glyph from the first character set.

4. The computer-implemented method of claim 1, further comprising:
determining that a first priority list specifies that the first font file is to be searched before the first font patch file; and
searching one or more character sets included in the first font file for a first character set that corresponds to the first character.

5. The computer-implemented method of claim 4, further comprising:
determining that the first font file does not include the first character set;
determining that the first priority list specifies that the first font patch file is to be searched after the first font file; and
searching one or more character sets included in the first font patch file for the first character set.

6. The computer-implemented method of claim 1, further comprising storing the first glyph in a first cache.

7. The computer-implemented method of claim 6, further comprising:
determining that a first priority list specifies that the first cache is to be searched before the first font file or the first font patch file; and
searching the first cache for a second glyph that corresponds to a second character included in the first set of characters.

8. The computer-implemented method of claim 1, further comprising:
retrieving, from at least one of the first font file or the first font patch file, a third set of glyphs; and
storing the third set of glyphs in a first cache.

9. The computer-implemented method of claim 1, further comprising:
sending a request for a second font patch file associated with the first font; and
receiving a second font patch file associated with the first font for storage in the read-write memory.

10. The computer-implemented method of claim 9, further comprising modifying a first priority list to specify that the second font patch file is to searched before the first font file or the first font patch file.

11. The computer-implemented method of claim 1, further comprising:
determining, by a font manager, that a first priority list specifies that a first cache is to be searched before the first font file stored in the read-only memory, and that the first font file is to be searched before the first font patch file stored in the read-write memory, wherein the first cache is separate from the read-only memory and the read-write memory;
searching one or more character sets included in the first cache for a first character set that corresponds to the first character;
determining that the first cache does not include the first character set; and
in response, searching one or more character sets included in the first font file for the first character set.

12. A device comprising:
a memory subsystem comprising:
read-write memory, and
read-only memory that stores a first font file; and
a processor coupled to the memory subsystem that:
receives a first font patch file for storage in the read-write memory,
wherein:
each of the first font file and the first font patch file is associated with a first font and a first language,
the first font file includes a first set of glyphs that is associated with the first font and used to render characters for display,
the first font patch file includes a second set of glyphs that is associated with the first font and used to render characters for display, wherein the second set of glyphs includes at least one glyph that is not included in the first set of glyphs, and
the first set of glyphs is static;
determines that a first text string includes a first set of characters that is to be rendered;
determines that a first priority list specifies that the first font file is to be searched before the first font patch file;
upon searching at least the first font file, retrieves, from at least one of the first font file and the first font patch file depending on whether a first glyph is included in the first set of glyphs, the first glyph corresponding to a first character included in the first set of characters; and
renders at least a portion of the first text string using the first glyph.

13. The device of claim 12, wherein the memory subsystem further comprises a first cache that stores at least the first glyph.

14. The device of claim 13, wherein the processor further:
retrieving, from at least one of the first font file or the first font patch file, a third set of glyphs; and
storing the third set of glyphs in the first cache.

15. The device of claim 12, wherein the read-only memory stores a second font file associated with a second font, and the processor further:
determines that the first font file does not include the first character set;
determines that the first priority list specifies that the second font file is to be searched after the first font file; and
searches one or more character sets included in the second font file for the first character set.

16. The device of claim 12, wherein the processor further:
receives a second font patch file for storage in the read-write memory, wherein the second font patch file is associated with the first font; and modifies the first priority list to specify that the second font patch file is to be searched before the first font file or the first font patch file.

17. The device of claim 12, wherein the first font patch file is stored in the read-write memory for a finite period.

18. The device of claim 12, wherein retrieving the first glyph from at least one of the first font file and the first font patch file comprises:
   searching one or more character sets included in at least one of the first font file and the first font patch file;
   identifying a first character set that corresponds to the first character; and
   retrieving the first glyph from the first character set.

19. One or more non-transitory computer-readable media storing instructions that, when executed by one or more processors, cause the one or more processors to render characters for display by performing the steps of:
   receiving, subsequent to a first font file being stored in read-only memory, a first font patch file for storage in read-write memory, wherein:
      each of the first font file and the first font patch file is associated with a first font and a first language,
      the first font file includes a first set of glyphs that is associated with the first font and used to render characters for display,
      the first font patch file includes a second set of glyphs that is associated with the first font and used to render characters for display, wherein the second set of glyphs includes at least one glyph that is not included in the first set of glyphs, and
      the first set of glyphs is static;
   determining that a first text string includes a first set of characters that is to be rendered;
   retrieving, from at least one of the first font file and the first font patch file depending on whether a first glyph is included in the first set of glyphs, the first glyph corresponding to a first character included in the first set of characters; and
   rendering at least a portion of the first text string using the first glyph.

20. The one or more non-transitory computer-readable media of claim 19, further comprising instructions that, when executed by the one or more processors, cause the one or more processors to perform the steps of:
   determining that a first priority list specifies that the first font file is to be searched before the first font patch file; and
   searching one or more character sets included in the first font file for a first character set that corresponds to the first character.

21. The one or more non-transitory computer-readable media of claim 20, further comprising instructions that, when executed by the one or more processors, cause the one or more processors to perform the steps of:
   determining that the first font file does not include the first character set;
   determining that the first priority list specifies that the first font patch file is to be searched after the first font file; and
   searching one or more character sets included in the first font patch file for the first character set.

* * * * *